United States Patent
Schmid et al.

(10) Patent No.: US 11,979,065 B2
(45) Date of Patent: May 7, 2024

(54) BRUSHLESS ELECTRIC MOTOR

(71) Applicant: Hilti Aktiengesellschaft, Schaan (LI)

(72) Inventors: Tobias Schmid, Emmenhausen (DE);
Helmut Burger, Unterdiessen (DE);
Lothar Dietl, Kaufering (DE)

(73) Assignee: Hilti Aktiengesellschaft, Schaan (LI)

( * ) Notice: Subject to any disclaimer, the term of this patent is extended or adjusted under 35 U.S.C. 154(b) by 141 days.

(21) Appl. No.: 17/288,411

(22) PCT Filed: Nov. 20, 2019

(86) PCT No.: PCT/EP2019/081932
§ 371 (c)(1),
(2) Date: Apr. 23, 2021

(87) PCT Pub. No.: WO2020/114773
PCT Pub. Date: Jun. 11, 2020

(65) Prior Publication Data
US 2021/0384803 A1      Dec. 9, 2021

(30) Foreign Application Priority Data
Dec. 4, 2018  (EP) .................................... 18209993

(51) Int. Cl.
| | |
|---|---|
| *H02K 11/215* | (2016.01) |
| *H02K 5/15* | (2006.01) |
| *H02K 5/16* | (2006.01) |
| *H02K 7/14* | (2006.01) |

(52) U.S. Cl.
CPC ............. *H02K 11/215* (2016.01); *H02K 5/15* (2013.01); *H02K 5/16* (2013.01); *H02K 7/145* (2013.01); *H02K 2211/03* (2013.01)

(58) Field of Classification Search
CPC ........ H02K 11/215; H02K 5/15; H02K 7/145; H02K 2211/03
USPC .................................................... 310/50, 68 B
See application file for complete search history.

(56) References Cited

U.S. PATENT DOCUMENTS

| | | | |
|---|---|---|---|
| 7,791,232 B2 * | 9/2010 | Purohit .................. | H02K 1/278 310/68 B |
| 10,205,365 B2 | 2/2019 | Beyerl et al. | |
| 2008/0150401 A1 | 6/2008 | Lin et al. | |
| 2017/0288499 A1 | 10/2017 | Beyerl et al. | |
| 2018/0152073 A1 | 5/2018 | Michishita | |

FOREIGN PATENT DOCUMENTS

| | | |
|---|---|---|
| CN | 1139738 A | 1/1997 |
| CN | 203660853 U | 6/2014 |
| CN | 205960897 U | 2/2017 |
| CN | 107834782 A | 3/2018 |
| CN | 108418319 A | 8/2018 |

(Continued)

OTHER PUBLICATIONS

International Search Report of PCT/EP2019/081932, dated Dec. 6, 2019.

*Primary Examiner* — Jose A Gonzalez Quinones
(74) *Attorney, Agent, or Firm* — Davidson, Davidson & Kappel, LLC

(57) ABSTRACT

Brushless electric motor for an electric handheld power tool, wherein the electric motor has an end plate and a Hall board which is arranged on the end plate, wherein the Hall board is axially fixed to the end plate by an elastic O-ring.

13 Claims, 3 Drawing Sheets

(56) References Cited

FOREIGN PATENT DOCUMENTS

| | | | |
|---|---|---|---|
| DE | 102005050271 A1 * | 4/2007 | ........... H02K 11/215 |
| DE | 102008037737 A1 | 3/2009 | |
| DE | 102008037737 A1 * | 3/2009 | ........... H02K 11/215 |
| EP | 1662637 A2 * | 5/2006 | ............. H02K 29/06 |
| JP | H07227055 A | 8/1995 | |
| JP | H09182403 A | 7/1997 | |
| JP | 2001078381 A | 3/2001 | |
| JP | 2011160522 A | 8/2011 | |
| KR | 101502288 B1 | 3/2015 | |
| RO | 127331 | 4/2012 | |
| RO | 127331 A0 | 4/2012 | |

* cited by examiner

BRUSHLESS ELECTRIC MOTOR

The present invention relates to a brushless electric motor for an electric handheld power tool. The electric motor has an end plate and a Hall board which is arranged on the end plate.

BACKGROUND

Brushless electric motors of the kind mentioned in the introductory part are known, in principle, from the prior art and are used, for example, in modern handheld power tools. The Hall board typically has one or more Hall sensors for identifying a rotor position of a rotor of the electric motor, as a result of which sensor-based electronic commutation can be performed.

SUMMARY OF THE INVENTION

It is an object of the present invention to provide an electric motor which can be easily assembled/disassembled.

The present invention provides that the Hall board is axially fixed to the end plate by means of an elastic O-ring. The invention includes the finding that Hall boards in electric motors of the prior art are typically fastened by means of screw connection or hot-caulking. In the case of screw connection, this leads to increased expenditure on assembly. Hot-caulking prevents removal of the Hall board without destruction, or at least makes this considerably more difficult.

In contrast to this, the Hall board in the brushless electric motor according to the invention is axially fixed to the end plate by means of an elastic O-ring, so that firstly expenditure on assembly (given a comparatively compact construction) is reduced and secondly—in the sense of functional integration—exact axial positioning of the Hall board is ensured by the clamping action of the elastic O-ring. It has proven to be advantageous when the Hall board is axially fixed to the end plate exclusively by means of the O-ring.

The end plate is preferably a B end plate, that is to say the end plate which is situated opposite the drive side of the electric motor. The Hall board and the O-ring are preferably located on a side of the end plate that is averted from the rotor. The end plate can be connected to a stator of the electric motor. The end plate and the stator can be integrally formed with one another.

In a particularly preferred refinement, the end plate has a central bearing for receiving a rotor axis. The central bearing can be fastened to the end plate by means of at least one radial retaining web.

It has proven to be advantageous when the Hall board is supported against the at least one radial retaining web in the axial direction. At least one supporting collar, against which the O-ring is supported, can be formed on the central bearing. Three supporting collars which are uniformly spaced apart from one another are preferably provided. The supporting collar can have a contact area for the O-ring, which contact area is oriented obliquely in relation to the rotor axis. An angle which is enclosed between the rotor axis and the surface normal of the contact area can, for example, be less than 90 degrees, preferably between 40 and 60 degrees.

In a further preferred refinement, the Hall board is designed, in the form of a disk, with a concentric hollow-cylindrical recess. An inside diameter of the recess is preferably greater than an outside diameter of the central bearing including the at least one supporting collar. In this way, the Hall board can be axially pushed onto the central bearing and can then be secured in an interlocking manner in the axial direction by the O-ring.

The present invention also provides an electric handheld power tool, preferably a rechargeable battery-operated handheld power tool, comprising an electric motor of the above-described type.

Further advantages can be found in the description of figures that follows. The figures depict various exemplary embodiments of the present invention. The figures, the description contain numerous features in combination. A person skilled in the art will expediently also consider the features individually and combine them to produce useful further combinations.

BRIEF DESCRIPTION OF THE DRAWINGS

In the figures, identical and similar components are denoted by the same reference signs. In the figures.

DETAILED DESCRIPTION

Figure 1:
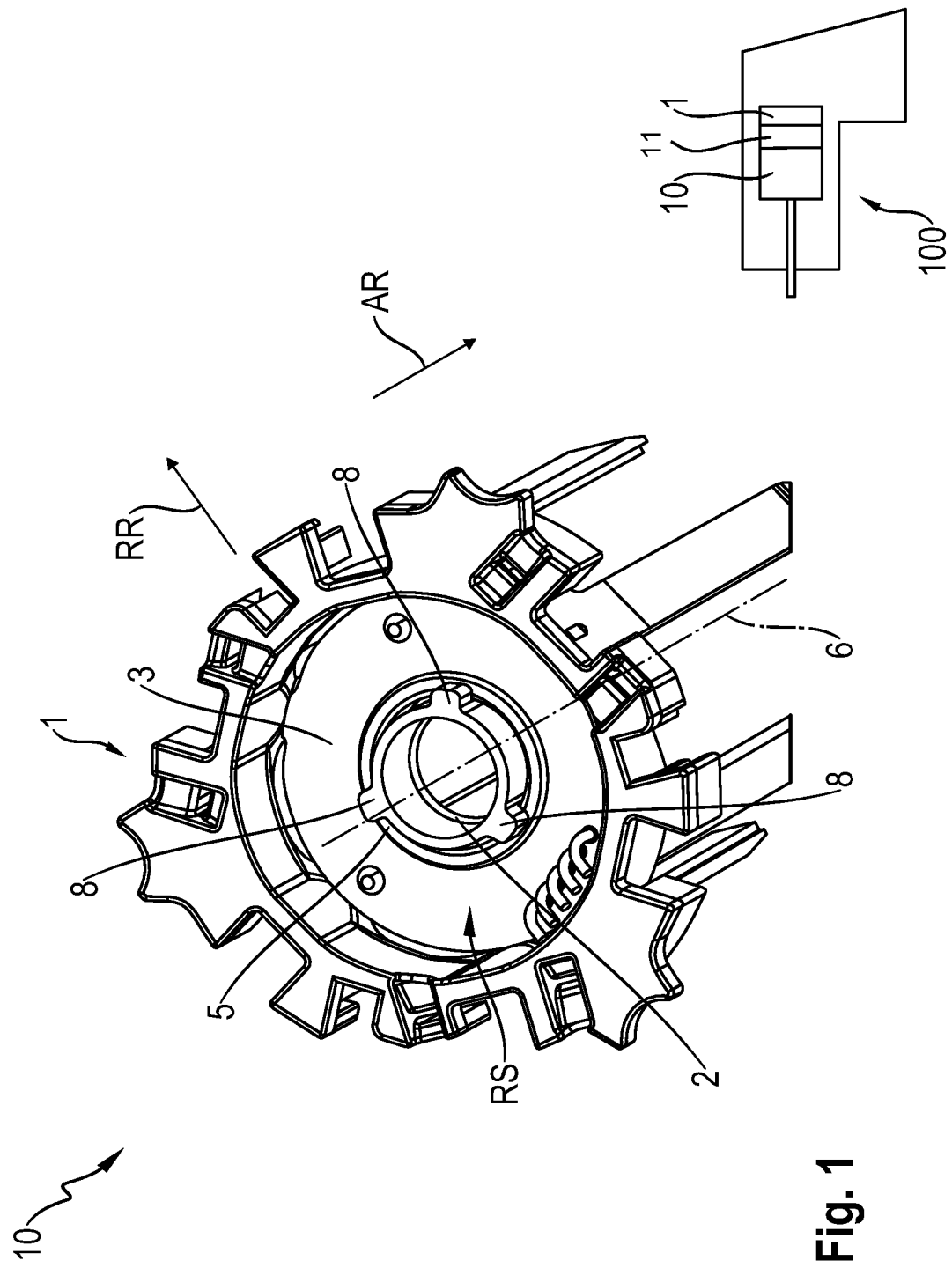
FIG. 1 shows a first preferred exemplary embodiment of a brushless electric motor according to the invention looking at the side that is averted from the rotor.

A preferred exemplary embodiment of a brushless electric motor 10 according to the invention looking at the side RS that faces away from the rotor is depicted in FIG. 1. The electric motor 10 has an end plate 1 and a Hall board 3 which is arranged on the end plate 1. In the exemplary embodiment depicted in the present case, the end plate 10 is a B end plate, that is to say the end plate which is situated opposite the drive side of the electric motor 10. For reasons of clarity, the electric motor 10 is not shown in its entirety, that is to say, in particular, a stator winding or a stator core (apart from a few stator segments which are connected to the end plate 1) is not depicted in FIG. 1.

According to the invention, the Hall board 3 is axially fixed, that is to say fixed in the axial direction AR, to the end plate 1 by means of an elastic O-ring 5. In the present case, the Hall board 3 is axially fixed to the end plate 1 exclusively by means of the O-ring 5. The Hall board 3 and the O-ring 5 are both located on the side RS of the end plate 1 that faces away from the rotor and is shown in FIG. 1.

FIG. 1 clearly shows that the end plate 1 has a central bearing 2 for receiving a rotor axis 6. A rotor 11 of the electric motor 10 itself is shown in FIG. 1 solely schematically. Three supporting collars 8, against which the O-ring 5 is supported in the axial direction AR, are formed on the central bearing 2.

An electric handheld power tool 100 which is equipped with an electric motor 10 according to the invention is schematically depicted at the bottom right of FIG. 1.

Figure 2:
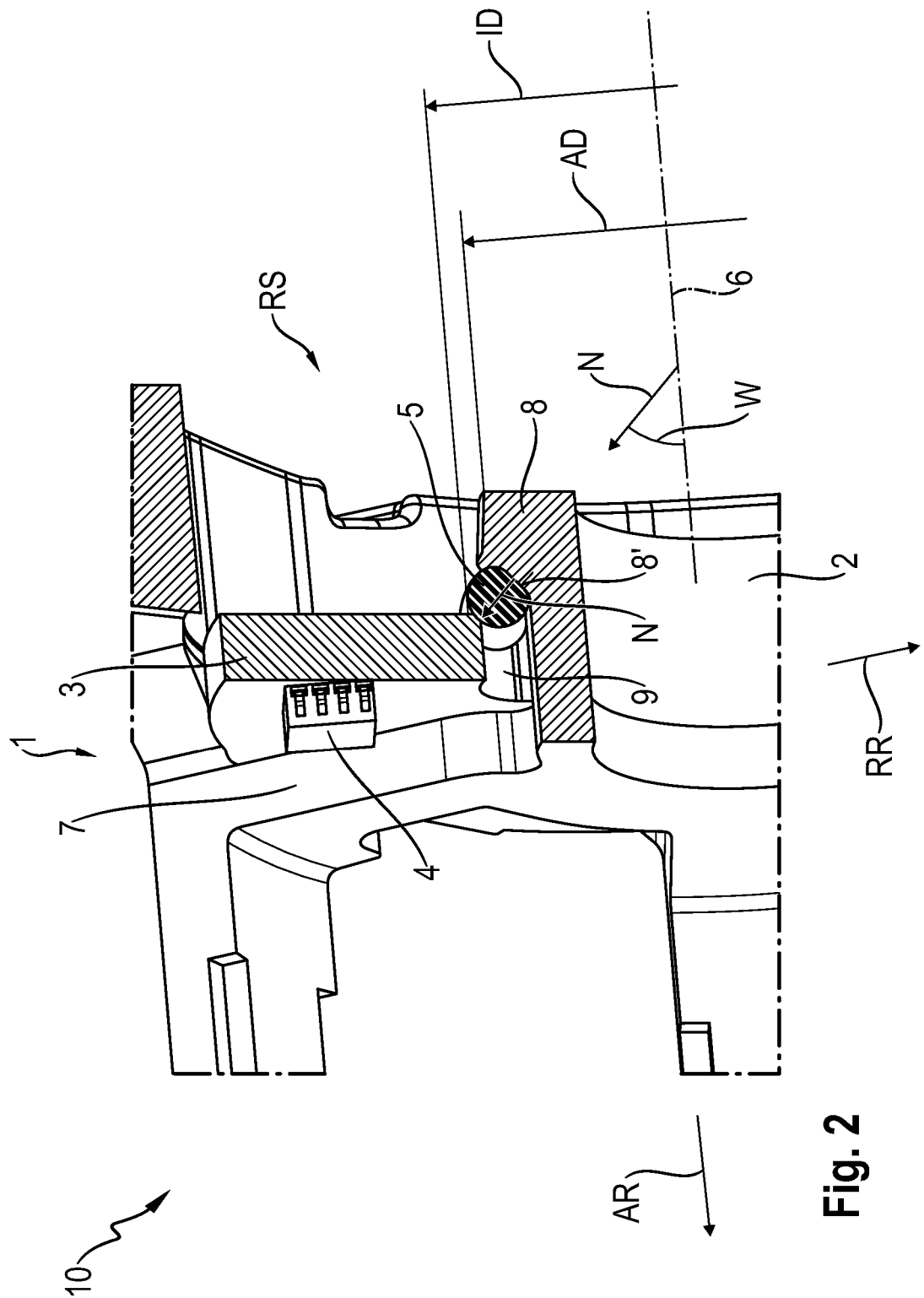
FIG. 2 shows a section through the end plate of the electric motor of FIG. 1.

FIG. 2 shows a section through the end plate 1 of the electric motor 10 of FIG. 1. Said figure clearly shows that the central bearing 2 is fastened to the end plate 1 by means of a radial retaining web 7 (cf. FIG. 3). In this case, the Hall board 3 is firstly supported against the radial retaining web 7 in the axial direction AR. Secondly, the elastic O-ring 5 is supported against the supporting collar 8, which is formed on the central bearing 2, in the axial direction AR. Therefore, the Hall board 3, which has one Hall sensor 4 here by way of example, is axially fixed to the end plate 1 by means of the elastic O-ring 5.

The supporting collar 8 has a contact area 8' for the O-ring 5, which contact area is oriented obliquely in relation to the rotor axis 6. In this case, an angle W which is enclosed between the rotor axis 6 and the surface normal N of the contact area 8' is less than 90 degrees. In the exemplary embodiment illustrated in the present case, the angle W is approximately 45, this constituting a good compromise between clamping action and ease of assembly.

As can be gathered from FIG. 2, the Hall board 3 is designed, in the form of a disk, with a concentric hollow-cylindrical recess 9. In this case, an inside diameter ID of the recess 9 is greater than an outside diameter AD of the central bearing 2 including the supporting collar 8. Therefore, the Hall board 3 can be pushed onto the central bearing 2 in the axial direction AR and can then be secured in an interlocking manner in the axial direction AR by the O-ring 5. In this case, the exact positioning of the Hall board 5 in the axial direction AR is ensured by the clamping action of the elastic O-ring 5.

Figure 3:
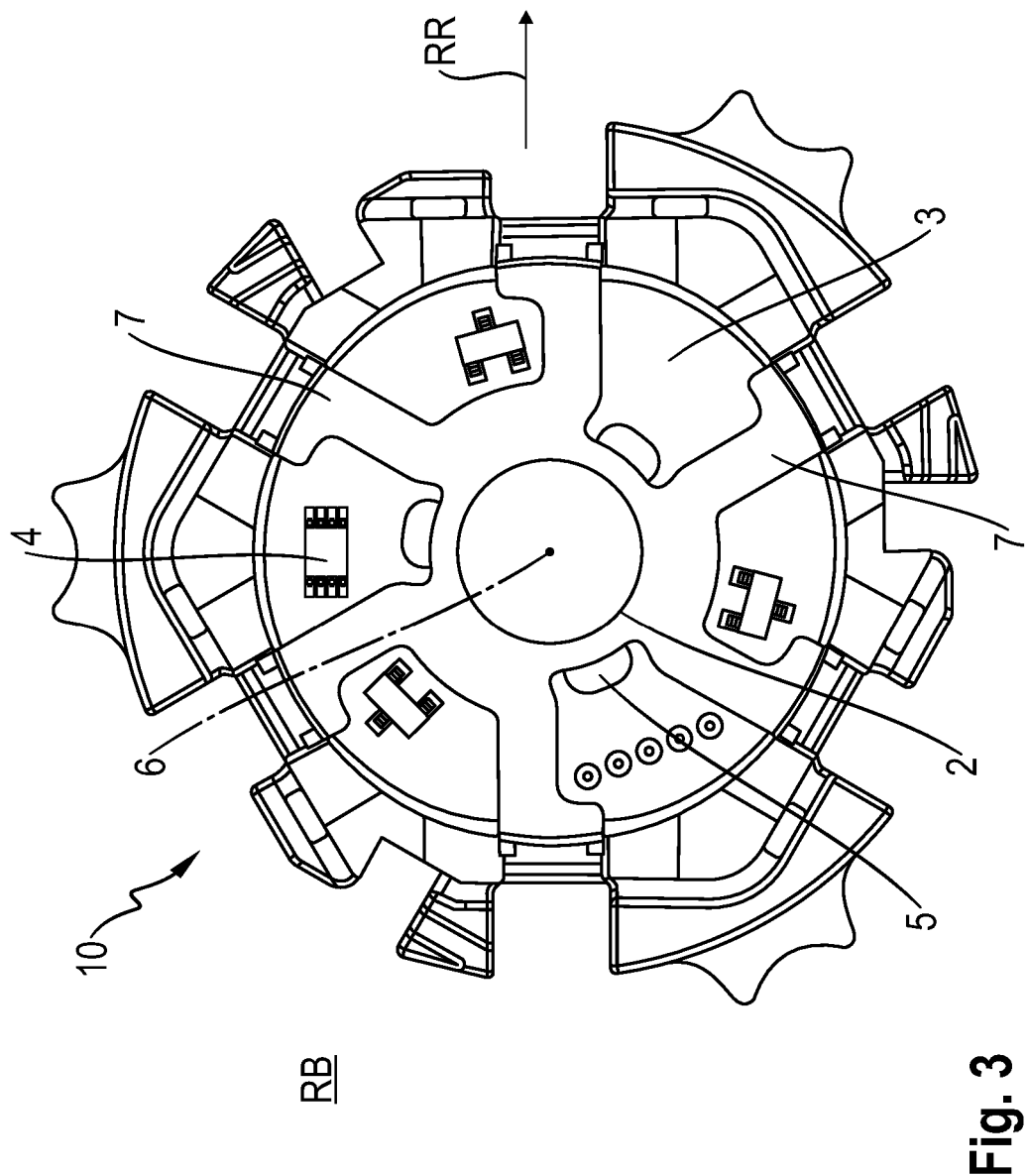
FIG. 3 shows a rotor-side view of the end plate of the electric motor of FIG. 1.

FIG. 3 now shows a rotor-side view RB of the end plate of the electric motor of FIG. 1. Said figure clearly shows the central bearing 2 and the rotor axis 6 which is arranged coaxially in relation to said central bearing. In the exemplary embodiment depicted in the present case, the central bearing 2 is fastened to the end plate 1 by means of six retaining webs 7 which each extend in the radial direction RR.

As can be gathered from FIG. 3, the disk-like Hall board 3 is exactly positioned in the radial direction RR by the O-ring 5 which can be identified through the Hall board 3 in sections. This, in the sense of functional integration, at the same time as the exact positioning of the Hall board 5 in the axial direction AR by the clamping action of the elastic O-ring 5 mentioned in relation to FIG. 2.

LIST OF REFERENCE SIGNS

1 End plate
2 Central bearing
3 Hall board
4 Hall sensor
5 O-ring
6 Rotor axis
7 Radial retaining web
8 Supporting collar
8' Contact area
9 Recess
10 Brushless electric motor
100 Electric handheld power tool
AD Outside diameter
AR Axial direction
ID Inside diameter
N Surface normal
RB Side that faces the rotor
RR Radial direction
RS Side that is averted from the rotor
W Angle

What is claimed is:

1. A brushless electric motor for an electric handheld power tool, the electric motor comprising:
   an end plate having a central bearing for receiving a rotor axis;
   a Hall board arranged on the end plate, the Hall board being axially fixed to the end plate by an elastic O-ring; and
   at least one supporting collar formed on the central bearing, the O-ring being supported against the supporting collar.

2. The electric motor as recited in claim 1 wherein the Hall board is axially fixed to the end plate exclusively by the O-ring.

3. The electric motor as recited in claim 1 wherein the central bearing is fastened to the end plate by at least one radial retaining web.

4. The electric motor as recited in claim 3 wherein the Hall board is supported against the at least one radial retaining web in the axial direction.

5. The electric motor as recited in claim 1 wherein the supporting collar has a contact area for the O-ring, the contact area oriented obliquely in relation to the rotor axis.

6. The electric motor as recited in claim 5 wherein an angle between the rotor axis and a surface normal of the contact area is less than 90 degrees.

7. The electric motor as recited in claim 6 wherein the angle is between 40 and 60 degrees.

8. The electric motor as recited in claim 1 wherein the Hall board includes a disk with a concentric hollow-cylindrical recess.

9. The electric motor as recited in claim 8 wherein an inside diameter of the recess is greater than an outside diameter of the central bearing.

10. The electric motor as recited in claim 9 wherein the inside diameter of the recess being greater than a supporting collar outside diameter.

11. The electric motor as recited in claim 1 wherein the Hall board and the O-ring are located on a side of the end plate facing away from the rotor.

12. An electric handheld power tool comprising the electric motor as recited in claim 1.

13. A brushless electric motor for an electric handheld power tool, the electric motor comprising:
   an end plate having a central bearing for receiving a rotor axis and fastened to the end plate by at least one radial retaining web; and
   a Hall board arranged on the end plate, the Hall board being axially fixed to the end plate by an elastic O-ring, the Hall board being supported against the at least one radial retaining web in the axial direction.

\* \* \* \* \*